(12) United States Patent
Tanny

(10) Patent No.: US 6,203,713 B1
(45) Date of Patent: Mar. 20, 2001

(54) METHOD FOR FILTERING AT OPTIMIZED FLUID VELOCITY

(75) Inventor: Gerald Tanny, Rehovot (IL)

(73) Assignee: Osmotek Ltd., Rehovot (IL)

( * ) Notice: Subject to any disclaimer, the term of this patent is extended or adjusted under 35 U.S.C. 154(b) by 0 days.

(21) Appl. No.: 09/164,537

(22) Filed: Sep. 30, 1998

(30) Foreign Application Priority Data

Oct. 5, 1997 (IL) ......................................... 121884

(51) Int. Cl.$^7$ ..................................................... B01D 61/00
(52) U.S. Cl. ............................................ 210/767; 73/61.64
(58) Field of Search ............................... 210/637, 739, 210/767, 321.65, 137, 490; 73/865.9, 61.63, 61.64

(56) References Cited

U.S. PATENT DOCUMENTS

| | | |
|---|---|---|
| 3,455,146 | * 7/1969 | Smith et al. . |
| 4,787,949 | * 11/1988 | Cole et al. . |
| 4,983,288 | * 1/1991 | Karbachsch et al. . |
| 5,238,559 | 8/1993 | Nieweg . |
| 5,503,735 | 4/1996 | Vinas et al. . |

FOREIGN PATENT DOCUMENTS 05185070 7/1993 (JP) .

OTHER PUBLICATIONS

Warring, R.H. "Filters and Filtration Handbook". Houston: Gulf Publishing Company, pp. 55–56, 1981.*

Perry et al. "Perry's Chemical Engineers' Handbook, 6th edition". Mc–Graw Hill, pp. 19–65 to 19–67, 1984.*

"Filtration in the Pharmaceutical Industry", By Theodore H. Meltzer, Chapter 2,3, Marcel Dekker Inc., N.Y. Copyright 1987, ISBN 0–8247–7519–8.

* cited by examiner

Primary Examiner—Matthew O. Savage
Assistant Examiner—Richard W. Ward
(74) Attorney, Agent, or Firm—Helfgott & Karas, P.C.

(57) ABSTRACT

There is provided in accordance with the invention a method for filtering comprising the steps of: providing a filter assembly comprising a depth filter and at least one microporous membrane; determining an optimal fluid velocity of the filter assembly by the steps of: operating identical filter assemblies at different constant fluid velocities, each for a time duration which terminates when a given total pressure drop is reached thereacross; noting the total throughput for such time duration; and based on the total throughput for each of said different constant fluid velocities, establishing a functional relationship between fluid velocity and total throughput for said filter assembly; and operating the filter assembly at a constant fluid velocity which corresponds to a desired total throughput. In a preferred embodiment, the filter assembly has a selectable filter area and the method further includes the step of selecting the filter area for the filter assembly which enables a desired flow rate to be realized for operation of the filter assembly at the fluid velocity which corresponds to the desired total throughput.

2 Claims, 4 Drawing Sheets

METHOD FOR FILTERING AT OPTIMIZED FLUID VELOCITY

FIELD OF THE INVENTION

This invention relates to a filter element and a filter device for purifying water that is or may be infected by microorganisms and rendering it potable and to a method for purifying water by means of such filter device, in the most efficient manner.

BACKGROUND OF THE INVENTION

In many localities, no safe and reliable water supply is available. A water distribution system may be lacking, or, frequently, such a system may exist but deliver water that is not or may not be safe and fit for drinking because it is contaminated, particularly by microorganisms. The problem of providing safe, potable water in such localities, has received wide attention and found a variety of solutions in the art.

Filtration is one of the means that can be used. In most cases, the filters used in water purification apparatus operate at constant pressure mode. viz. a filter is placed on a source of constant pressure and allowed to filter water until its rate of filtration is below some predetermined unacceptable value. In some cases, some degree of flow rate control is provided. For instance, U.S. Pat. No 5,503,735 discloses a liquid purification system which provides a reverse osmosis filter membrane in a filter cartridge. Not all of the water passes through the membrane and the water not passing through the membrane passes through a pressure relief valve which can be adjusted to vary the water pressure and flow rates in the system. Devices which maintain a constant flow rate and variable pressures are employed in the systems in which water flows, for instance, in irrigation systems. Processes for controlling the flow-through speed of the filter infiltration devices are also known. One such device is described in U.S. Pat. No. 5,238,559.

JP 06185070 (Kokai No. 5-185070) notes that in domestic water purifiers the filter module must be replaced when the water that has flown through it has exceeded the allowable absorption capacity of the absorbent inside the module, and that water purifiers are known which are provided with a life meter capable of displaying the time of replacing the filter module. However, the known devices are said to be unreliable because they measure only the time of the water flow and this does not provide a reliable indication due to fluctuations in the water flow rate. Therefore said application proposes a domestic water purifier which comprises a constant flow rate valve, a sensor for detecting start and stop of water flow and generating corresponding signals, and means for measuring an integrated operating time based on said signals and displaying a signal when said integrated time reaches a preset value. The application shows various structures of constant flow rate valves, but as to the filter module it shows no structure and states that the invention may utilize various structures of the prior art.

The filters used in water purification systems of the prior art, particularly those intended not merely to remove solid substances, but to remove microorganisms and render the water fully potable, are not fully satisfactory from several viewpoints. The throughput of the filters is usually low, so the filters must be changed frequently. The filters must have a large surface area. Since microporous membranes are required for the removal of microorganisms, such filters are very expensive.

It is a purpose of this invention to provide a filter device that is adapted for purifying water, and which is free of the defects of the existing devices.

It is another purpose of this invention to provide a filter element for making such a filter device.

It is a further purpose of this invention to provide a process for making such a filter element and filter device.

It is a still further purpose of this invention to provide a method for optimizing the operation of said filter device.

Other purposes and advantages of the invention will appear as the description proceeds.

SUMMARY OF THE INVENTION

The filter device according to the invention is composed of a number of component filter elements, although each filter element by itself would be capable of a filtering action. A filter element according to the invention comprises:

a)—an innermost drainage layer, preferably a substantially open, plastic netting;

b)—two layers of microporous membrane, preferably supported each on a support fabric layer disposed between it and said drainage layer; and more preferably, having a retentivity greater than 95% for microorganisms, said two layers being symmetrically disposed adjacent to the two sides of said drainage layer;

c)—two layers of a depth filter or prefilter (these two terms being used as synonyms in this specification), preferably a glass fiber filter, symmetrically disposed adjacent to the two outer sides of said microporous membrane layers;

d)—said microporous membrane layers and said depth filter layers being sealed together along a top edge, preferably extending above the top of said drainage layer and of said support fabric layers, if present;

e)—said drainage layer and said microporous membrane layers, as well as said support fabric layers, if present, extending at their bottom below the bottom of said depth filter layers, said microporous membrane layers being sealed to said depth filter layers at the bottom of these latter; and f)—said microporous membrane layers and said depth filter layers being wider than said drainage layer, and said support fabric layers, if any, and being sealed together along their lateral edges.

The terms "top" and "bottom" refer to the position which the filter element will have in the complete filter device. Said filter device comprises a base plate having a central opening and an upper surface, and a plurality of elements as hereinbefore defined, arranged parallel to one another and perpendicular to said base plate, and traversing said central opening thereof with the bottom of their depth filter layers at the level of said base plate upper surface, said filter elements being potted to said base plate by filling with adhesive the space between them and the inner edge of said base plate's central opening. The said filter further comprises a sealed housing, in which the base plate with the filter elements potted thereto is enclosed in a tight manner.

In an embodiment of the invention, the microporous membrane layers and the depth filter or prefilter layers of the aforesaid filter element are sealed together by means of adhesive.

In other embodiment of the invention, the depth filter layers are laminates, each comprising a layer of porous thermoplastic fabric, and the microporous membrane layers and their support layers are thermoplastic. If the melting temperature of the microporous membrane layer is at least 50° C. higher than those of at least one of the remaining thermoplastic layers, the layers can be sealed together by the application of pressure and heat as better explained hereinafter.

The invention also provides a method of purifying water, provided that it not drinking water. The purification of water that is not fit for drinking, to render it potable, and the purification of potable water, to increase its purity—botrh purification being included in the expression "purifying drinking water"—are not comprised in this invention and are disclaimed herein. Said method comprises causing the water to flow at a constant flow rate through a purification filter comprising depth filter or prefilter and microporous membrane filter means, monitoring the time from the installation of the filter, monitoring the aggregate time during which the water is flowing through the filter, and preventing the flow of water through the filter when either of those times has reached a predetermined threshold value. The means for driving the water through the filter at a constant flow rate may comprise means for applying pressure to the filter and means for controlling the flow rate regardless of changes in the pressure drop across the filter, such as a flow restrictor of a known type. The depth filter means and microporous membrane means are preferably structured and assembled as in the filter element hereinbefore defined, so that the filter as a whole is the filter device hereinbefore defined, but the method of the invention could be carried out with filters of different structure, provided that they comprise depth filter and microporous membrane filter means which the water successively flows through to be purified.

DETAILED DESCRIPTION OF PREFERRED EMBODIMENTS

Figure 1:
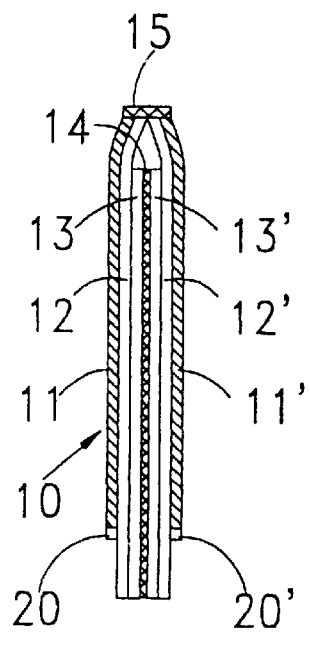
FIG. 1 is a cross-sectional view of the filter element according to an embodiment of the invention.
Figure 2:
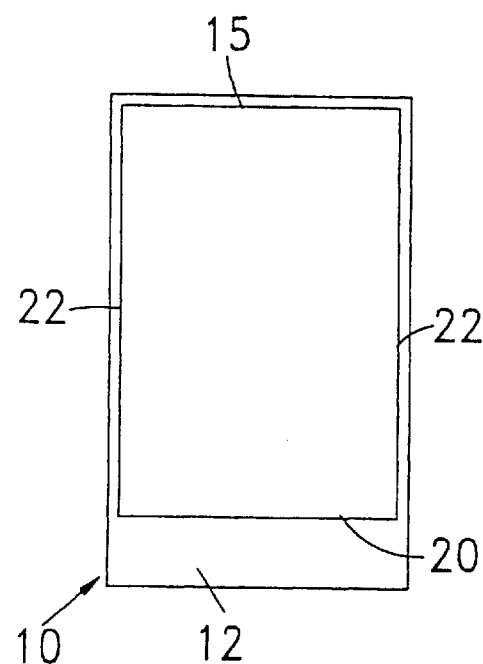
FIG. 2 is a front view of the same element.

In the embodiment shown in FIGS. 1 and 2, a filter element 10 comprises two outer layers of depth filter or prefilter 11 and 11', which are preferably made of glass fiber. Internally, of layers 11 and 11', the filter element comprises layers 12 and 12' of microporous membrane, preferably having a retentivity greater than 95% for microorganisms, which are supported respectively on support fabrics 13 and 13'. All the aforesaid layers are arranged symmetrically about a substantially open plastic netting 14, which constitutes a drainage layer to conduct away the fluid passing through the aforesaid layers 11–11', 12–12', and 13–13'. Layers 11–11' and 12–12' are congruent and sealed together by means of adhesive, particularly a hot melt adhesive, or by welding. Depth filter layers 11–11' and the microporous membrane layers 12–12' are also sealed together at the edges 22. The drainage layer 14 and the fabric support layers 13–13' do not extend up to the top of the element, viz. to the seal 15, although, in an embodiment of the invention in which welding is used, the layers 13 and 13' may reach to the edge seal and be sealed thermoplastically together. In FIGS. 1 and 2, both prefilter layers 11–11' do not reach to the bottom of the element, but the microporous membrane layers, support fabric layers and drainage layers protrude beyond them towards the bottom. The depth filter layers 11–11' are sealed at 20–20' to the microporous membrane layers 12–12'. Support layers 13–13' and drainage layer 14 are narrower than the other layers and do not take part in seals 22.

Figure 3:
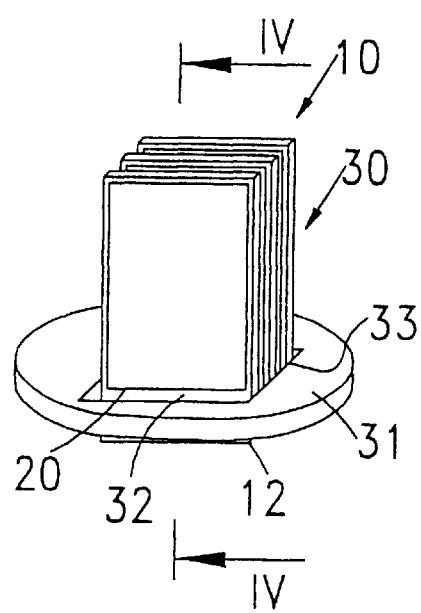
FIG. 3 is a perspective view of a filter device according to an embodiment of the invention, in an intermediate stage of its manufacture.
Figure 4:
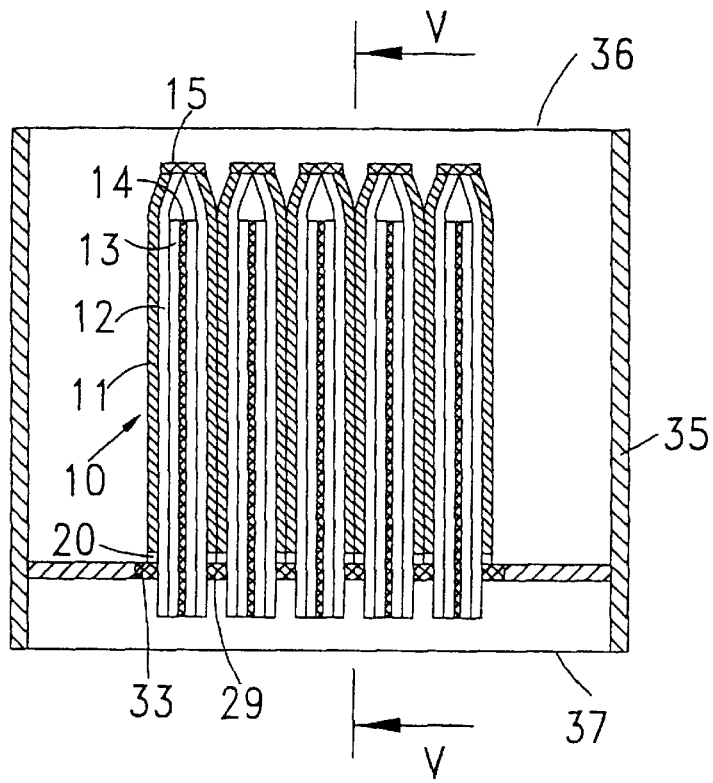
FIG. 4 is a cross-sectional view of a filter device according to an embodiment of the invention, taken on a plane passing through the center lines of the filter elements.
Figure 5:
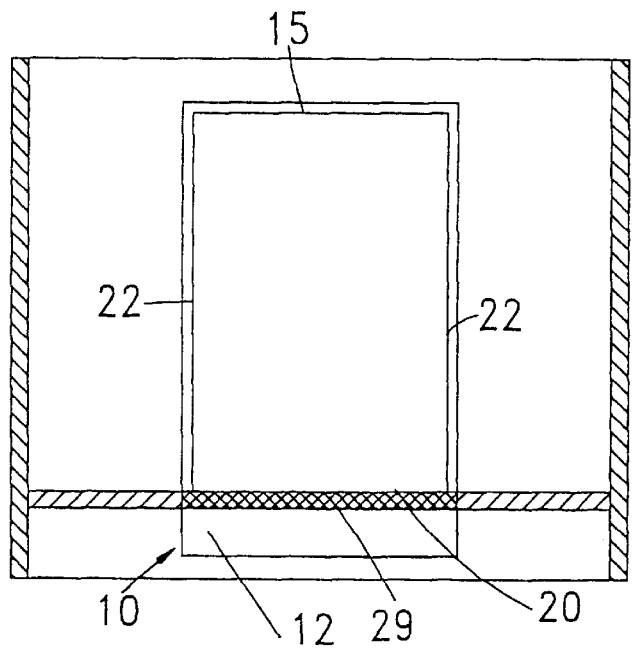
FIG. 5 is a cross-sectional view of the filter device of FIG. 4, taken on a plane parallel to the filter element and passing through the center line of the filter element.

A number of filter elements 10 are connected to provide a filter device, as illustrated in FIGS. 4 and 5, 3 indicating an intermediate stage of the manufacture of the filter device. This latter, generally indicated at 30, comprises a base plate 31 having a central opening 32, the peripheral edge of which is indicated at 33. Filter elements 10 are passed through said central opening 32 and placed in such a way that their edges 20 are at the same level as the upper edge of base plate 31. In FIG. 3, central opening 32 is not filled with filter elements 10, but a space is left therein at the front of the device as seen in the drawing.

In FIGS. 4 and 5, the filter is complete and the central opening 32 is filled with elements 10. The filter elements are in place, they are potted to the base plate by filling the empty space between them and the inner edge 33 of opening 32 with a suitable adhesive 29, so that no path of fluid flow exists between the elements 10 and the base plate 31. Base plate 31 is then mechanically sealed into an appropriate filter housing 35. The housing is open at the top, as indicated at 36, to provide an inlet for water to be filtered. The water passes through the various layers of each element 10, entering from outer depth layer s 11–11' and exiting from drainage layer 14, and reaches an opening of housing 35, indicated at 37, which is the filtered water outlet.

Figure 6:
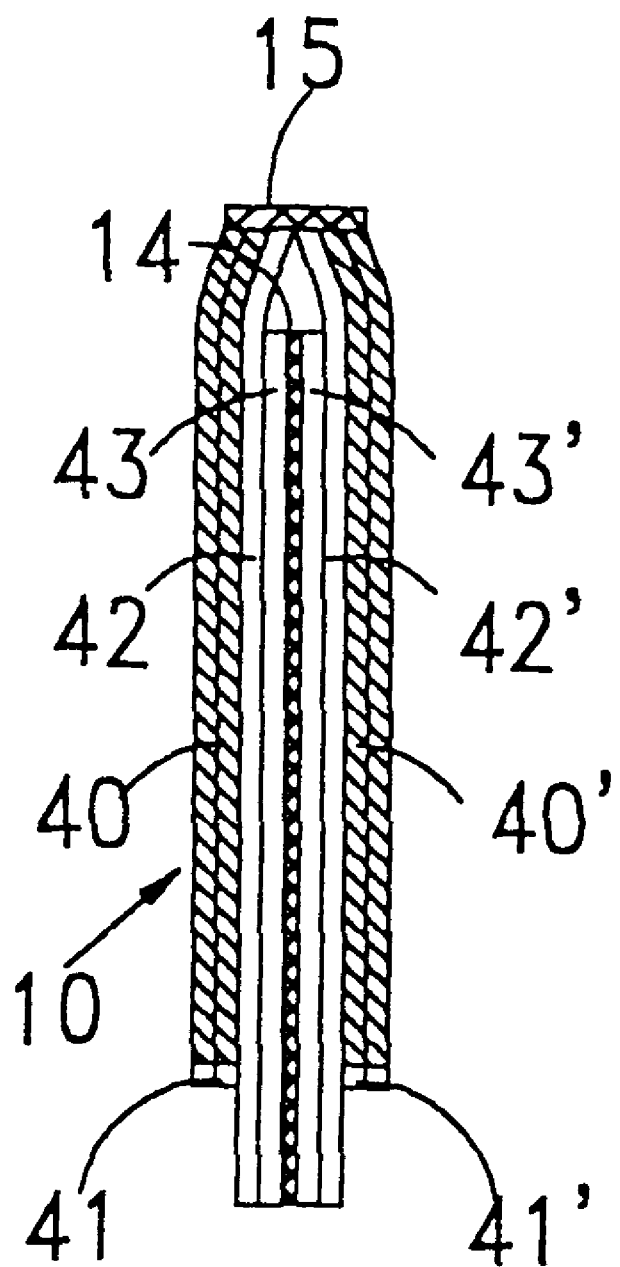
FIG. 6 is a cross-sectional view similar to FIG. 1, of a filter element according to a different embodiment of the invention.

In another embodiment of the invention, illustrated in FIG. 6, the prefilter layers are replaced by laminates of glass fiber filter layer 40–40' and porous synthetic fabric layers 41–41' of melt temperature $T_1$, microporous membrane layers 42–42' are prepared from thermoplastic material having, melt temperature $T_2$, and support layers 43–43' are also of porous synthetic fabric of melt temperature $T_3$ and are congruent with the preceding layers along edges 15 and 22 (these latter not shown in this Figure, but in FIG. 2). Provided that $T_2$ is at least 50° C. higher than $T_1$ or $T_3$, then the aforesaid seams 15 and 22 of the element can be created in a single step by welding under pressure with a hot die whose temperature is greater than either $T_1$ or $T_3$.

Water is purified by passing it through a plurality of filters at a constant flow rate. With this type of filter, it has been found that operation of the filter at constant flow rate is greatly advantageous with respect to operation at constant pressure, since a filter device operated constant flow rate requires a much smaller membrane surface area, even ten times smaller, to achieve the same overall throughput of a device operated at constant pressure. A filter device according to the invention, having a filter area of 0.05 sq. meters, may produce 3,000 liters of filtered water at the constant flow rate of 2 liters/minute, when operating on tap water with an average filtration index value of 10, and need not be changed, before producing said volume of filtered water, more than once in three months.

When operating at constant pressure the following phenomena occur in a filter comprising a prefilter and a microporous membrane. At the beginning of the process, the hydraulic resistance of the filter is lowest, the flow rate is at a maximum and the efficiency of the prefilter is lowest, since this is decreased as the velocity of the particles increases. As a consequence, particles pass through the prefilter and are captured on the surface of the microporous membrane, blocking pores and reducing the flow rate. As the filtration continues, the fluid velocity continues to decrease and as a result, the capture efficiency of the prefilter finally improves. The resistance of the prefilter and membrane increases until the combined resistance is such that the filter no longer provides a useful flow rate. When operating at constant flow rate, it is possible to choose a fluid velocity such that a maximum number of particles are captured by the prefilter from the beginning of the filtration process, so that the total throughout of the filter is greatly increased.

The general method of optimization of the operation of the filter according to the invention, and more generally of a filter comprised of a depth filter and a microporous membrane filter, for the filtration of water that is not drinking water, consists of the following steps:

1. A filter element operating at some initially convenient constant flow rate, is tested until a predetermined total pressure drop across the filter has been reached.
2. The results are plotted as in FIG. 7, in which Total Throughput is plotted versus Fluid Velocity (obtained by dividing the flow raze by the filter element surface area).
3. The testing is continued, either by changing the constant flow rate, or by changing the surface area of the elements, until the whole of FIG. 7 has been generated.
4. The desired total throughput is chosen, and a convenient combination of constant flow rate and surface area of membrane element is then chosen.
5. The filter is operated in a constant flow mode, in accordance with number 4 above.

Figure 7:
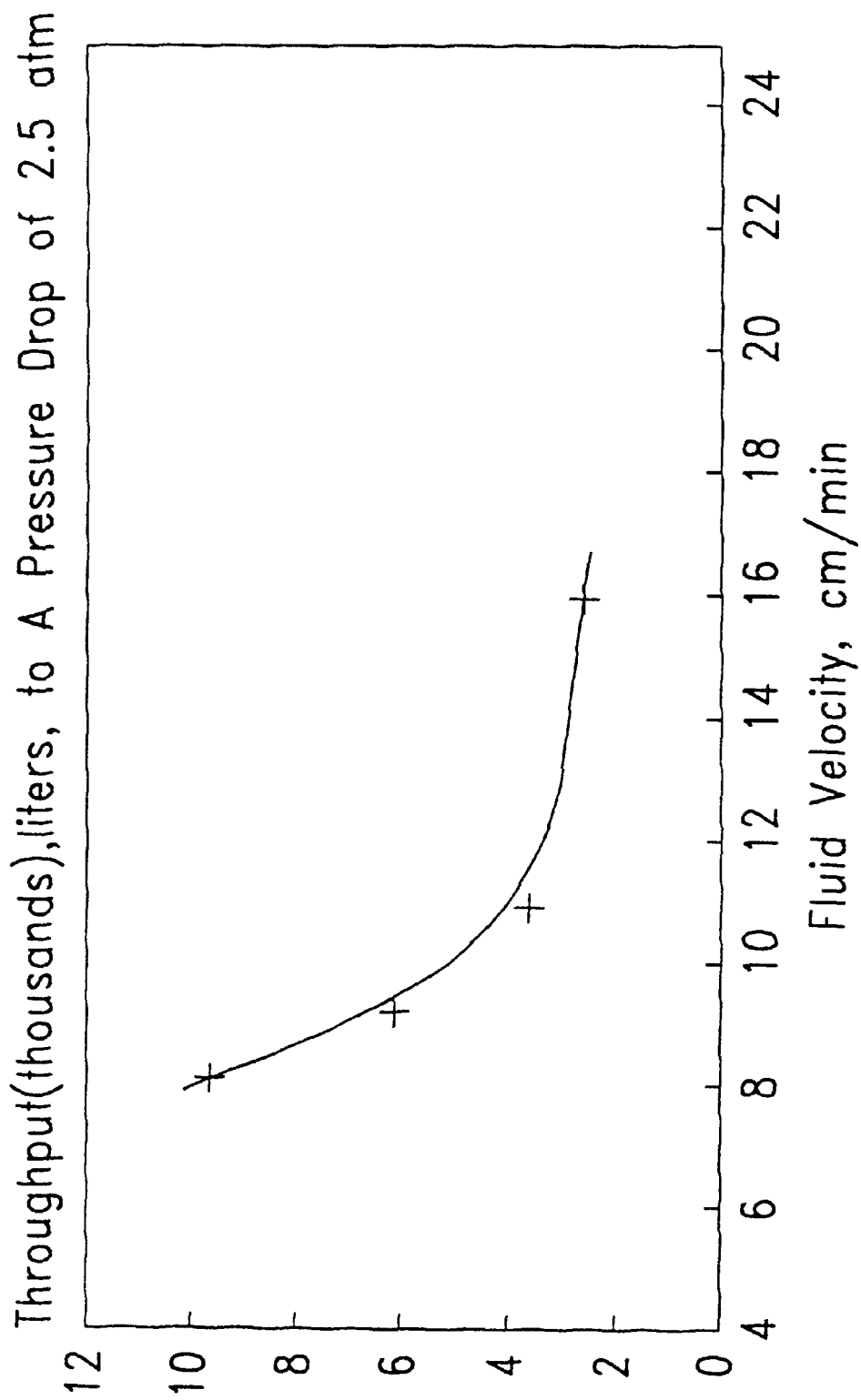
FIG. 7 is a diagram in which Total Throughput to reach a Pressure Drop of 2.5 atmospheres, in thousands of liters, is plotted versus Fluid Velocity in cm/min.

Data for Total Throughput (to a pressure drop of 2.5 bar) are shown in FIG. 7 for a flat sheet membrane filter element containing a glass fiber depth filter and a nominal 0.2 micron pore size microporous membrane. One can clearly see that when operated in constant flow, below a critical velocity, the Total Throughput of the membrane filter can be increased several fold.

The prefilter or depth filter layer 12 is preferably any prefilter material known in the art and could include, without being limited to fibrous or particulate, inorganic or organic material such as glass fiber, carbon, cellulose, polyolefins or other synthetic polymeric materials. The prefilter can also be in the form of a compressed, highly porous block of fibers, microfibers or particles, containing pores at least 5× the diameter of the pores in the membrane, or in, the form of a woven or non-woven fabric, all of which are known in the art. A non-woven glass fiber material, containing no binding agents, with an approximate thickness of 450 microns and a nominal particle removal rating of 1 micron, is especially preferred for use in the filtration of tap water.

Microporous membrane layer 14 is preferably a microporous filter with pores between 0.05 and 0.45 microns, and which is commonly fabricated from high temperature thermoplastics polymers, such as polysulphone, nylon, polyvinylidene fluoride, or inorganic materials, such as ceramic materials, or metals, and has a water permeability between 0.05–30 cc/sq. cm/sec/atm, as are commonly known in the art, as those described in chapters 2–4 of "Filtration in the Pharmaceutical Industry", by Theodore H. Melzer, Marcel Dekker Inc. N.Y., Copyright 1987, ISBN 0-82471-7519-8.

Membrane support layer 16 is preferably a woven or non-woven fabric of a synthetic material which does not swell or distort in water. Non-woven fabrics prepared from polyolefins are particularly useful for this purpose, as their range of melting temperature is well below that for many of the polymers used to fabricate membrane layer 14. Ideally this layer should have a maximal permeability, but anyway no less than ten times that of the membrane layer supported.

Plastic netting 18, for separating layers of filter material in order to create a fluid path, is available in a wide number of thermoplastic materials, prepared by extrusion or other processes, such as weaving continuous plastic filaments, and is well known in the art. Examples of such material are the polypropylene nets manufactures by Nalle Plastics, Austin. Tex., under the trademark Naltex.

The following example illustrates the invention without involving any limitation.

A membrane filter element with an effective filter surface area of approximately 24 sq. cm. was prepared from A/E glass fiber prefilter material (Gelman Sciences, Ann Arbor, Mich., U.S.A.), Super 200 microporous membrane (Gelman Sciences, Ann Arbor, Mich., U.S.A.), a polypropylene non-woven fabric as the membrane support layer and a polypropylene net (Nalle Plastics, Tex. U.S.A.) to create the drain path. Epoxy adhesive was used to create the glue seams. A number of such elements were potted with epoxy adhesive into a 4 mm Thick plastic base plate to form a filter assembly, in order to create filter assemblies with effective filtration surface areas between 50 and 500 sq. cm. Suitable hot melt adhesives are available on the market, e.g. from the Bostik, H. B. Fuller and Collano companies.

Each filter assembly was secured in an appropriate housing and was first integrity tested by the bubble point technique. After a short water flush, the entrance to the housing was connected to a source of gas pressure, and the exit tube conducting filtered water from the housing was placed in a vessel of water. The pressure of the gas was slowly raised until the first steady stream of bubbles was seen to issue from the housing exit tube. This pressure, 3.2 atmospheres, referred to as the bubble point, was found to be within 0.1 atmospheres of that specified by the manufacturer for the Supor 200 membrane, thereby confirming that the housing and the filter assembly were integral, and that she membrane was of the designated nominal pore size.

The housing was then placed in a constant flow test stand and set for a constant flow rate of 2 liters per minute. Pressure gauges before and after the housing measured the pressure drop, and the test was concluded when the pressure drop exceeded 2.6 bar. An integrating water meter measured the cumulative throughput. The test data for such assemblies are shown in FIG. 7. The quality of the water was periodically monitored by the silt density or filtration index technique, and the index was found to vary between 8 and 15 during the day, with an average value of 10–12.

With reference to FIG. 7, a filter can be designed that uses a minimum amount of prefilter and membrane filter in order to achieve a predetermined goal of filter throughput and flow rate: e.g., a filter as herein described, which is required to provide a total throughput of 10,000 liters at a maximum pressure drop of 2.5 atmospheres and flow rate of 2 liters/min.

As shown by FIG. 7, the maximum fluid velocity for said throughput should not exceed 8 cm/min. Since the required flow rate is 2000 cc/min., the required filter surface area (both the prefilter and the membrane filter) is the total flow rate divided by the velocity, or 250 sq.cm. Of course, it is possible to provide a greater area in order to insure the filter performance and account for possible variations in the quality of the water (which, in the case of the data of FIG. 7, was found to be quite constant).

While a specific embodiment of the invention has been described for the purpose of illustration, it will be understood that the invention may be carried into practice by skilled persons with many modifications, variations and adaptations, without departing from its spirit or exceeding the scope of the claims.

What is claimed is:

1. A method for filtering comprising the steps of:

providing a filter assembly having a surface area comprising a prefilter disposed adjacent to at least one microporous membrane;

determining an optimal fluid velocity of the filter assembly by the steps of:

operating identical filter assemblies at different constant fluid flow rates, each for a time duration which terminates when a given total pressure drop is reached across each filter assembly;

noting the total throughput through each filter assembly for such time duration; and based on the total throughput for each of said different constant fluid flow rates, establishing a functional relationship between fluid velocity and total throughput for said filter assembly, wherein fluid velocity is obtained by dividing a given flow rate by the surface area of one of said filter assemblies; and operating said filter assembly to provide filtering at a constant fluid flow rate which corresponds to a desired total throughput.

2. A method for filtering according to claim 1 wherein said filter assembly has a selectable filter area and also including the step of:

selecting the filter area for said filter assembly which enables a desired flow rate to be realized for operation of said filter assembly at said fluid velocity which corresponds to said desired total throughput.

* * * * *